United States Patent [19]

Ridge

[11] 3,996,744

[45] Dec. 14, 1976

[54] AUTOMATIC CONTROL FOR HYDRAULIC POWER TRANSMISSION

[75] Inventor: William A. Ridge, Inman, Kans.

[73] Assignee: The Cessna Aircraft Company, Wichita, Kans.

[22] Filed: Sept. 2, 1975

[21] Appl. No.: 609,778

[52] U.S. Cl. .................................. 60/445; 60/450; 60/493; 417/212

[51] Int. Cl.² ....................................... F16H 39/46

[58] Field of Search ................... 60/445, 450, 493; 417/212

[56] References Cited

UNITED STATES PATENTS 3,486,334  12/1969  Miller .............................. 60/450
3,508,847   4/1970  Martin ........................... 417/300 X Primary Examiner—Edgar W. Geoghegan

[57] ABSTRACT

An automatic control for reducing a flow pressure compensated variable displacement pump to a standby condition while the pump operated motor is lowering a heavy static load. The pressure in the motor exhaust line caused by the static load actuates the control to cut-off pressure to the downstream sensing line of the pump flow control. A bleed orifice in that downstream sensing line depressurizes the line causing the pump displacement servo to stroke back the displacement of the pump to a standby condition.

6 Claims, 2 Drawing Figures

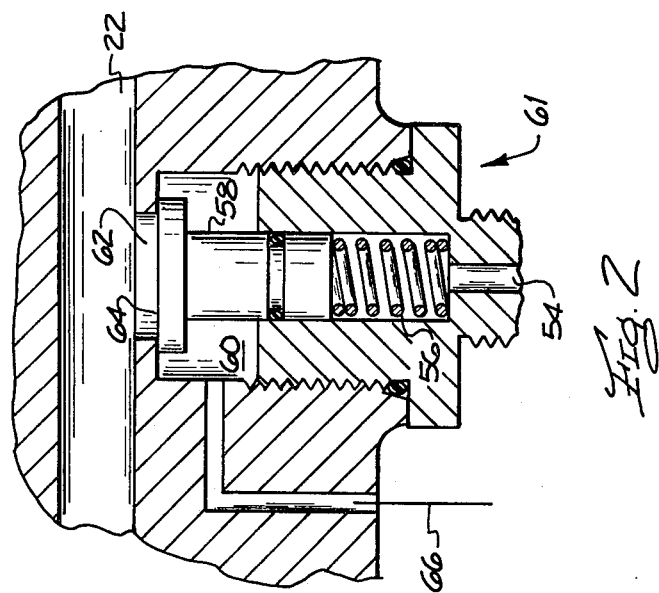
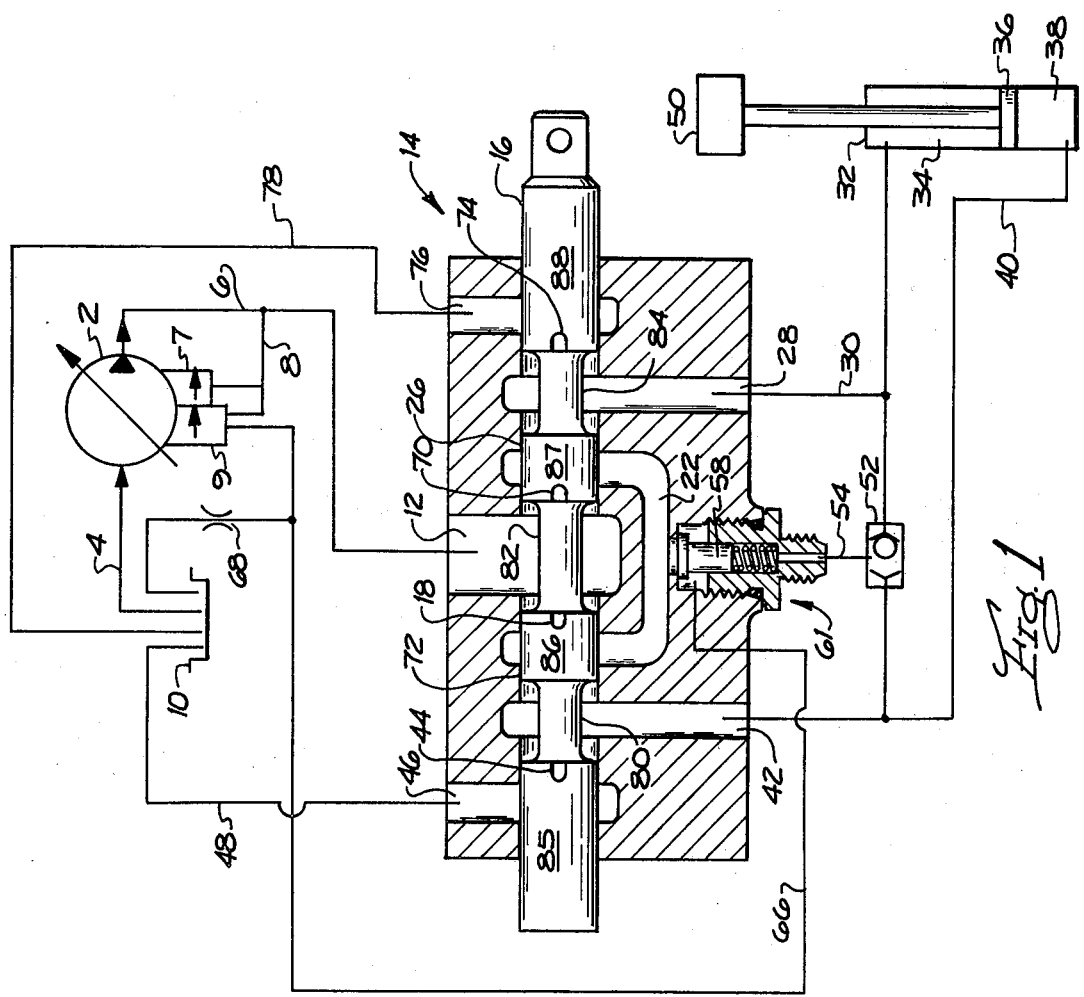

AUTOMATIC CONTROL FOR HYDRAULIC POWER TRANSMISSION

BACKGROUND OF THE INVENTION

Modern hydraulic power transmissions generally include a variable displacement pump, one or more motors and controls which direct the displacement of the pump to comply with the needs of the motors. These controls keep the system pressure from exceeding maximum limits and also attempt to keep the flow rate from the pump at the present needs of the system. Systems of this nature are typified in U.S. Pat. No. 3,508,847. A pressure compensating control adjusts the pump displacement by sensing the pressure at the pump outlet while the pump flow control senses the difference in pressure upstream and downstream of an orifice in the pump discharge flow. The present invention is an additional automatic control to avoid running the pump at a high pressure while a motor is lowering a heavy static load. This control is somewhat similar to the manual control described in U.S. Pat. No. 3,486,334 in that the additional control gives a signal to the flow control servo to reduce pump pressure to standby under a certain condition where the servo would otherwise sense a condition requiring more pressure and cause a waste of energy. This special condition of lowering a heavy static load is the condition where the present invention functions.

SUMMARY OF THE INVENTION

The invention is a load sensor actuated control which under a predetermined load closes off the sensing passage downstream of the flow control orifice to the servo controlling the pump displacement. There is also a bleed orifice in this sensing passage which relieves the remaining pressure in the sensing line to drain. The head of the load sensing piston is acted upon by the pump discharge pressure in a chamber of the control valve which tends to move the sensing piston toward its open position allowing that pressure to be sensed in the pump control servo. The opposite end of the piston is acted upon by the pressure in the motor exhaust line which experiences the static load and tends to move the piston to its closed position with the assistance of a spring. The spring force and relative areas of opposite ends of the piston are chosen so that when a certain static load is experienced by the motor the piston moves to its closed position blocking flow in the downstream sensing line thereby causing the pump servo to reduce its displacement and pressure to a standby condition. This could be 200 PSI, for example, or any other preset pressure.

The principal object of the present invention is to provide an improved and more efficient control for a closed center pressure flow compensated hydraulic system.

An additional object of the present invention is to provide automatically a control that will reduce the pump pressure and energy required in a pressure flow compensated system to a standby condition when a large static load is being lowered by the control valve through throttling of the motor exhaust. The conventional flow control servo increases pump pressure when pressure downstream from the orifice increases and approaches the pressure upstream of the orifice which ordinarily signals insufficient flow.

Another object of the present invention is to provide a standby pressure on the top of a cylinder lowering a heavy load so that when the load is removed from the cylinder there is no lag time waiting for the pump to catch up and drive the cylinder further downward.

BRIEF DESCRIPTION OF THE DRAWINGS

The invention will be more clearly understood when the description is read in connection with the accompanying drawings in which:

FIG. 1 is a partial schematic view of a closed center pressure flow compensated system including a variable delivery pump supplying motor fluid to a motor through a control valve shown in section accompanied by the controls of the present invention; and FIG. 2 is an enlarged sectional view of the automatic control valve embodying the present invention.

DETAILED DESCRIPTION OF THE INVENTION

Referring now to the drawing, and more particularly to FIG. 1, pump 2, symbolically shown, is a conventional axial piston positive displacement pump having a tiltable swash plate controlled by a positioning servo. The servo is controlled by a flow control 9 and a pressure control 7, both symbolically illustrated. The details of such a flow and pressure control are seen in U.S. Pat. No. 3,508,847 and are well known in the art. Briefly mentioning its operation, the tiltable swash plate bears against a number of pistons in a rotating cylinder block (not shown) causing the pistons to reciprocate and discharge fluid through pressure line 6 when the cylinder block is rotated. As the swash plate is tilted by the positioning servo, the displacement of the pump is decreased until it reaches an essentially zero displacement position. This position, called standby, provides sufficient pressure to keep the system in readiness to operate.

The pump 2 supplies motive fluid through pressure line 6 to control valve 14 which controls direction and speed of operation of motor 32. Valve 14 is operated by moving spool 16 axially from its center closed position, as shown in FIG. 1. Pressure line 6 enters pressure port 12 of control valve 14. Spool 16 of control valve 14 has lands 85, 86, 87 and 88 separated by grooves 80, 82 and 84. Land 85 has a metering notch 44, similarly land 86 has a notch 18, land 87 has a notch 70 and land 88 has a notch 74 permitting metered flow through control valve 14 to motor 32 and returning from motor 32 through control valve 14 to reservoir 10. Connecting passage 22 connects pressure port 12 with motor port 28 or 42 depending on which direction spool 16 is moved from its center closed position. Downstream sensing passage 66 connects connecting passage 22 to the flow control 9; upstream sensing passage 8 connects pressure line 6 to flow control 9 and pressure control 7. The sensing passages 8 and 66 thereby sense the pressure drop across land 86 or 87 depending on the direction of movement of spool 16. Supply line 4 connects pump 2 to reservoir 10.

Motor line 30 connects motor port 28 to the rod end of motor cylinder 34 and motor line 40 connects motor port 42 to the head end of motor cylinder 38. Motor 32 is a double acting linear cylinder having a piston 36 connected to a static load 50 through its piston rod. Two-way check valve 52 connects load sensing valve 61 through third sensing passage 54 to either motor line 30 or motor line 40. A bleed orifice 68 vents downstream sensing passage 66 to reservoir 10. Exhaust ports 46 and 76 lead from control valve 14 to reservoir 10.

Referring now to FIG. 2, the load sensing valve 61, also generally known as a pilot operated check valve, is shown to an enlarged scale to describe more clearly its parts and function. Load sensing piston 58 is biased by spring 56 toward closing port 62. Head 64 of load sensing piston 58 is within load sensor chamber 60 and can either close-off or open port 62. Opening port 62 allows the pressure existing in conecting passage 22 to reach downstream sensing passage 66. Head 64 is acted upon in one direction by the downstream pressure at port 62 which tends to open port 62, and in the other direction by the bias of spring 56 and the pressure from the third sensing passage 54 acting on piston 58, both of which forces tend to close port 62. The area of head 64 is greater than the area of piston 58, depending on the design requirements of the particular system.

In the system shown in FIG. 1 and described above, the static load 50 may be reversed in direction, or a reversible rotary motor substituted for the double acting linear motor 32, shown and described, without departing from the concept of the invention.

The mode of operation of the invention is when a heavy static load 50 is to be released by motor 32. Under such a condition, the spool 16 of control valve 14 is moved to a position opening metering notch 18 on land 86 permitting flow from pressure port 12 into connecting passage 22, and on into the rod end 34 of the cylinder. The load is controlled by metering the exhaust flow from the head end of the motor cylinder 38 across metering notch 44 to exhaust. The metering notch 18 in land 86 serves as the orifice which provides the differential pressure between upstream sensing passage 8 and downstream sensing passage 66, which through flow control 9 adjusts displacement of pump 2 to approach a uniform rate of flow. However, with a heavy static load 50 and the severe throttling effect of metering notch 44, the pressure in downstream sensing passage 66 increases until there is very little differential across the flow orifice, metering notch 18 in this example. The lack of sufficient pressure difference indicates to the pump that flow is insufficient, causing the flow control 9 to move the swash plate to full displacement, limited only by a maximum pressure in pressure control 7. This is an obvious waste of power since the static load 50 is capable of releasing itself without power, using the metering notch 44 as a throttle to obtain the desired rate of lowering. To avoid this power waste, pressure is removed from downstream sensing line 66 by a load sensor valve 61 actuated by the load pressure in motor line 40 which closes the source of the downstream pressure by moving piston 58 until its head 64 closes the load sensor port 62. With no fluid entering load sensor chamber 60, bleed orifice 68 vents pressure in downstream sensing passage 66 causing the swash plate to stroke back to a standby pressure of 200 PSI, for example. The double acting check valve 52 connects piston end of load sensor valve 61 through the third sensing passage 54 to the motor line 30 or 40, whichever has the higher pressure. Under the condition of releasing a heavy static load 50, the motor line 40 exhausting head end 38 of motor 32 has the higher pressure. Thus the operation just described reduces the pressure to standby as a heavy load is being released. The desired operation is obtained by selecting the proper spring 56, and the proper relative area between sensor port 62 and piston 58. The area of piston 58 is slightly less than the area of head 64 to guarantee that valve 61 will open, once the static load has been removed and it is desired to drive the motor piston 36 further with pump pressure.

When the heavy static load 50 is in the opposite direction and being lowered, the spool 16 is moved axially in the opposite direction and flow through control valve 14 is from pressure port 12 through metering notch 70 to connecting passage 22, through spool groove 80 to motor port 42, through motor line 40 to head end 38 of motor 32. Exhaust from rod end 34 of motor 32 is through motor line 30 to motor port 28, through spool groove 84, through metering notch 74 to exhaust port 76 and thence to reservoir 10. The operation is similar to that described above, but in the reverse direction. The operation of load sensor valve 61 is as described above, as is that of the two-way check valve 52.

Having described the invention with sufficient clarity to enable those familiar with this art to construct and use its general principles, I claim:

1. In a fluid energy transmission system which includes a driven variable displacement pump, a movable element for varying the displacement of the pump, a servo means having a piston operably connected to move the movable element to vary the pump displacement in response to different pressures and a pair of conduit means interconnecting the pump to a control valve and thence to a motor in a driving, recirculating relation, an improved control for such system comprising:

a flow-to-pressure transducer means which incorporates a flow restriction interposed in the control valve capable of generating a pressure differential upstream and downstream of the restriction which is proportional to the flow through the conduit means;

a first sensing line affording communication between the servo and the control valve at a point downstream of the flow restriction whereby the pressure actuates the servo piston to increase or decrease pump displacement to maintain a predetermined flow rate through the conduit means;

a bleed orifice venting the first sensing line to atmosphere;

a valve means in the first sensing line having a first position unrestricting flow in the first sensing line and a second position blocking flow in the first sensing line; said valve means including an actuating piston connected through a second sensing line to said motor whereby when a certain static load is experienced on said motor, the actuating piston actuates the valve means moving it to its second position blocking flow in the first sensing line causing the pump to stroke back to a standby condition.

2. The improved control described in claim 1, in which the flow restriction in the control valve is a metering notch in a land of a spool of the control valve.

3. The improved control described in claim 1, wherein the valve means includes a valving member having a head end exposed to the pressure downstream of said restriction urging the valve toward said first position and a piston end exposed to the pressure in said second sensing line urging the valve toward said second position, the area of the head end being greater than the area of said piston end.

4. The improved control described in claim 1, wherein the valve means includes a valving member having a head end exposed to the pressure downstream of said restriction urging the valve toward said first position and a piston end exposed to the pressure in said second sensing line urging the valve toward said second position, the area of the head end being ten percent greater than the area of the piston end.

5. The improved control described in claim 1, wherein the valve means includes a valving member spring biased towards said second position having a head end exposed to the pressure downstream of said restriction urging the valve toward said first position and a piston end exposed to the pressure in said second line urging the valve toward said second position, the area of the head end being greater than the area of said piston end.

6. The improved control described in claim 1, wherein said valve means is a pilot operated check valve allowing flow to the servo; including a valving member having a head end exposed to pressure downstream of said restriction urging the valve toward said first position and a piston end exposed to the pressure in said second sensing line urging the valve toward said second position, the area of the head end being greater than the area of the piston end.

* * * * *